Feb. 22, 1966 G. W. BROWN ETAL 3,235,904
PICKING MACHINE WITH MULTIPLE FINGER ACTION
Filed March 20, 1964 3 Sheets-Sheet 1
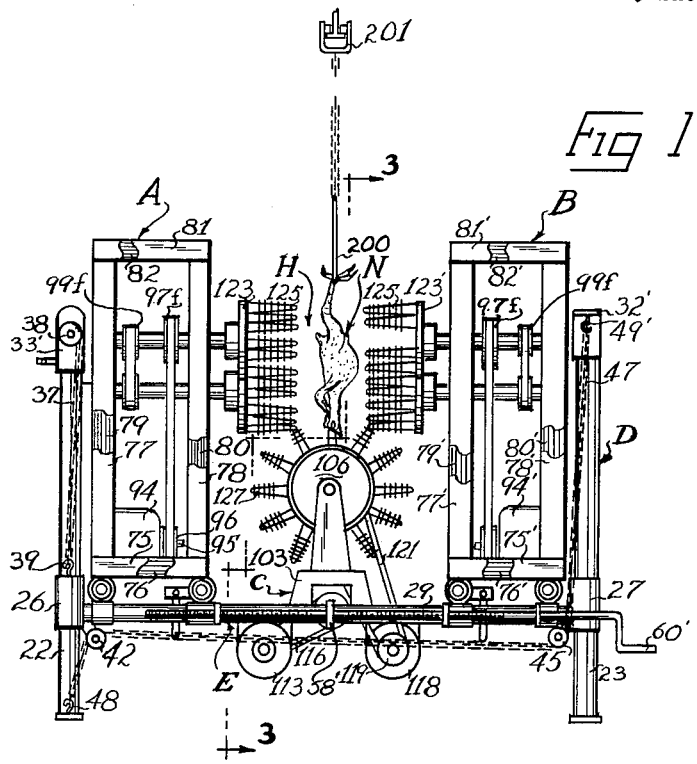
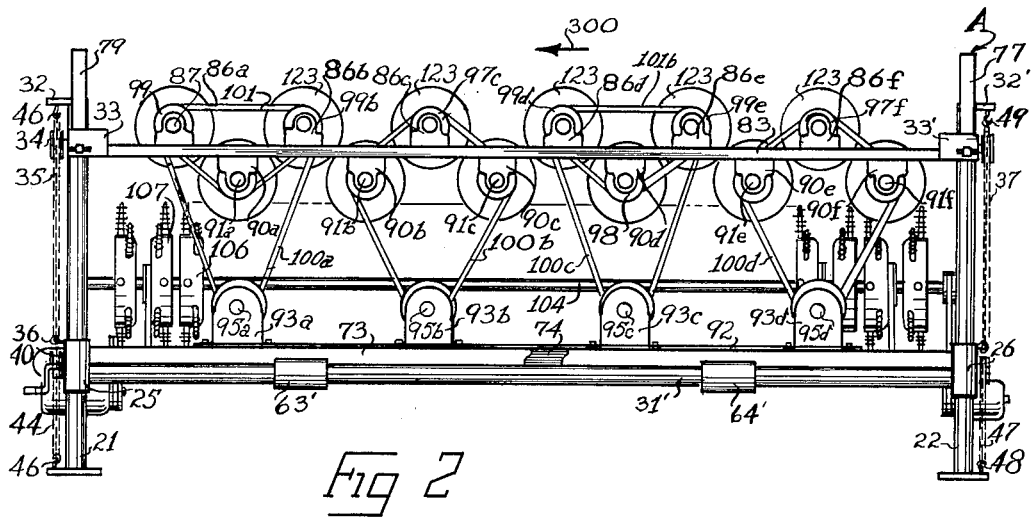
INVENTOR.
GEORGE W. BROWN
CHARLES V. CORN
BY
Newton, Hopkins + Jones
ATTORNEYS

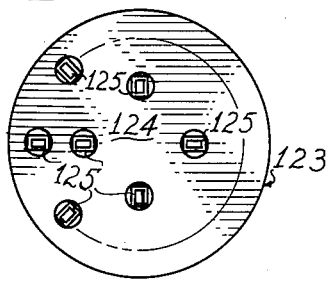
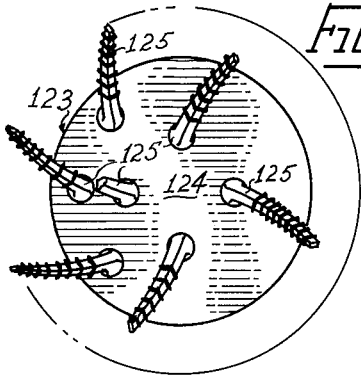
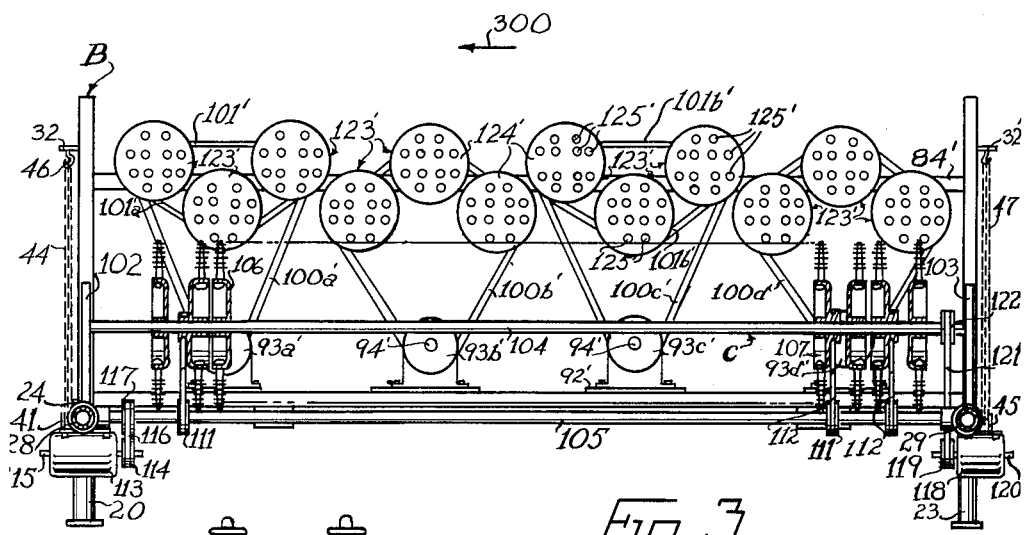
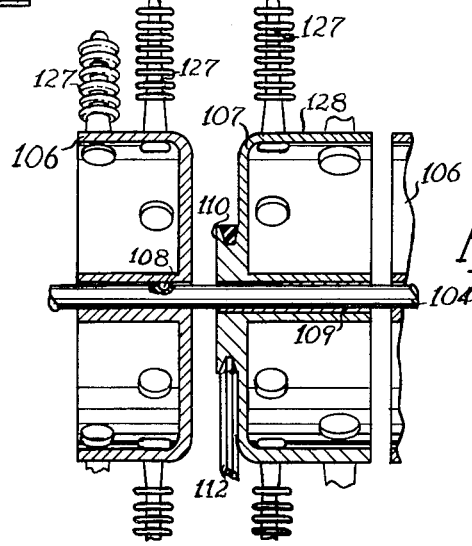

Feb. 22, 1966  G. W. BROWN ETAL  3,235,904
PICKING MACHINE WITH MULTIPLE FINGER ACTION
Filed March 20, 1964  3 Sheets-Sheet 3
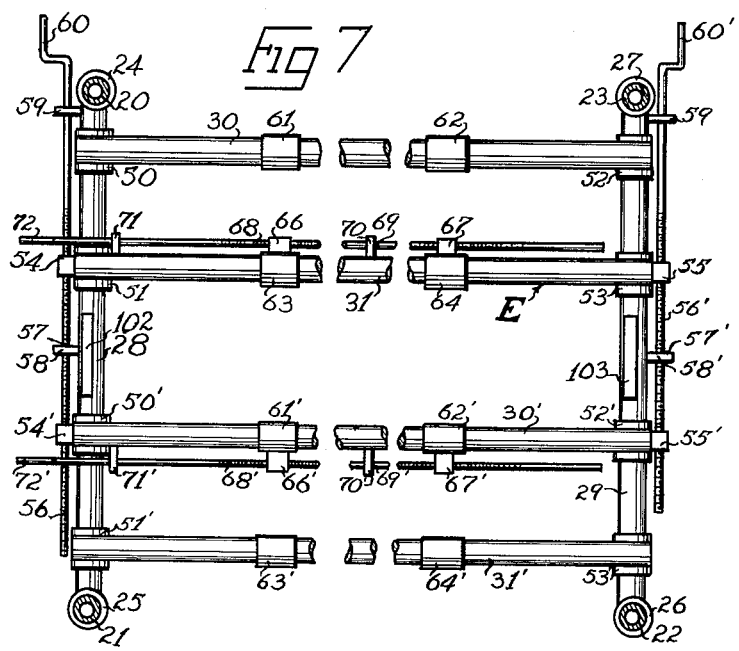
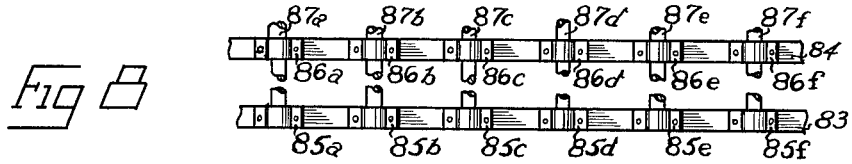
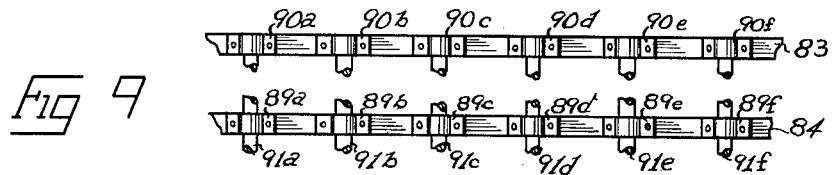
INVENTOR.
GEORGE W. BROWN
CHARLES V. CORN
BY
Newton, Hopkins & Jones
ATTORNEYS

United States Patent Office 3,235,904
Patented Feb. 22, 1966

3,235,904
PICKING MACHINE WITH MULTIPLE
FINGER ACTION
George W. Brown, Atlanta, and Charles V. Corn, Gainesville, Ga., assignors to Gainesville Machine Company, Inc., Gainesville, Ga., a corporation of Georgia
Filed Mar. 20, 1964, Ser. No. 353,355
10 Claims. (Cl. 17—11.1)

This invention relates to a chicken picking machine and more particularly to a picking machine with multiple finger action for removing the feathers from a chicken or other fowl with a plurality of fingers rotating about axes of rotation extending toward the direction of travel of the chicken or other fowl through the machine and with a plurality of fingers rotating about an axis of rotation parallel to the direction of travel of the chicken or fowl through the machine.

Rotary drum type chicken picking machines are well known in the art. These previous chicken picking machines customarily employ a plurality of rotary drums having a plurality of flexible rubber picking fingers extending from the periphery thereof to accomplish the removal of feathers from a chicken suspended head downward from a shackle carried by a conveyor belt. These previous machines have in most instances effectively removed feathers from most portions of the body of a chicken. However, several different machines, each having specially arranged drums have frequently been necessary to completely accomplish the removal of feathers from all portions of a chicken or fowl. This is because previous chicken picking machines using a plurality of rotary drums to remove feathers from most portions of a chicken's body often do not completely remove the feathers from the hocks, shoulders and neck of a chicken.

The invention disclosed herein will remove feathers from all portions of a chicken's body in a completely satisfactory manner. Those portions of a chicken's body from which it has previously been difficult to completely remove feathers using rotary drums are completely cleaned of feathers by the present invention.

The present invention has a plurality of flexible rubber picking fingers which extend inwardly from opposite sides of the picking machine toward the direction of travel of the chicken through the picking machine and a plurality of flexible rubber picking fingers which extend upwardly toward the chicken as it passes through the picking machine. The plurality of flexible rubber picking fingers which extend toward the chicken from opposite sides of the picking machine are rotated about an axis of rotation extending toward the direction of travel of a chicken or fowl through the picking machine and the picking fingers are positioned in a manner which causes the body of the fowl to be engaged by the picking fingers moving both in the direction of motion of the fowl through the picking machine and in a direction opposite to the direction of motion of the fowl through the picking machine.

The plurality of flexible rubber picking fingers extending upwardly toward the chicken as the chicken passes through the picking machine are rotated in planes of motion transverse to the direction of motion of the chicken through the picking machine, and the picking fingers in adjacent planes of motion are rotated in opposite directions.

The plurality of picking fingers extending toward a chicken as it passes through the picking machine from opposite sides of the picking machine and the plurality of picking fingers extending upwardly toward the chicken as the chicken passes through the picking machine serve to form a three sided channel of picking fingers through which the chicken is passed and in which the body of the chicken is struck by picking fingers moving in opposite directions transverse to the direction of motion of the chicken and in opposite directions parallel to the direction of motion of a chicken through the picking machine.

Moreover, as those picking fingers extending from opposite sides of the picking machine toward the chicken rotate about their axes of rotation, these picking fingers curve outwardly as the result of centrifugal force so that a substantial portion of the length of each picking finger strikes the chicken with a wiping action. This wiping action of those fingers extending toward the chicken from opposite sides of the picking machine combined with the tendency of those picking fingers rotating in planes of rotation transverse to the direction of motion of the chicken through the picking machine to force the chicken alternately toward one or the other side of the picking machine results in substantially all the feathers being removed from the chicken.

These and other features and advantages of the present invention will be more clearly understood from the following detailed description and the accompanying drawings in which like characters of reference designate corresponding parts in all figures and in which:

FIG. 1 is an end elevational view of an embodiment of the present invention showing the three picking frames positioned parallel to each other.

FIG. 2 is a side elevational view of the embodiment of the present invention shown in FIG. 1 showing that side of the right picking frame most remote from the path of a chicken through the present invention.

FIG. 3 is a cross-sectional view of the embodiment of the present invention taken along the line 3—3 in FIG. 1.

FIG. 4 is a fragmentary sectional view of some of the plurality of rotary drum segments mounted on the drum axle of the present invention.

FIG. 5 is a front elevational view of one of the plurality of rotating members of the present invention showing the arrangement of the plurality of flexible picking fingers when the rotating member is not being rotated.

FIG. 6 is a front elevational view of one of the plurality of rotating members of the present invention showing the arrangement of the plurality of flexible picking fingers when the rotating member is being rotated.

FIG. 7 is a partial top plan view of the carriage of the present invention.

FIG. 8 is a fragmentary top plan view of the right picking frame of the present invention showing the positions of the upper axles along the support members.

FIG. 9 is a fragmentary bottom plan view of the right picking frame of the present invention showing the position of the lower axles along the support members.

These figures and the following detailed description disclose a specific embodiment of the invention but the invention is not limited to the details disclosed since it may be embodied in other equivalent forms.

This invention is best understood as comprising a right picking frame generally indicated by the letter A, a left picking frame generally indicated by the letter B, an intermediate picking frame generally indicated by the letter C, and a main frame generally indicated by the letter D. The main frame D supports the right picking frame A and the left picking frame B in positions parallel to each other and the intermediate picking frame C in a position between the right picking frame A and the left picking frame B and parallel to the right picking frame A and the left picking frame B.

The main frame D has vertical posts 20, 21, 22 and 23. A collar 24 is slidably positioned on the post 20, a collar 25 is slidably positioned on the post 21, a collar 26 is slidably positioned on the post 22, and a collar 27 is slidably positioned on the post 23. A first transverse member 28 extends horizontally between the collar 24 and the collar 25 and a second transverse member 29 extends horizontally between the collar 26 and the collar 27.

The first transverse member 28 is extended through a block 50, a block 51, a block 50', and a block 51' and the second transverse member 29 is extended through a block 52, a block 53, a block 52', and a block 53'. A first longitudinal member 30 extends horizontally between the block 50 and the block 52 and a second longitudinal member 31 extends horizontally between the block 51 and the block 53. Similarly, a third longitudinal member 30' extends horizontally between the block 50' and the block 52' and a fourth longitudinal member 31' extends horizontally between the block 51' and the block 53'.

The collars 24, 25, 26 and 27, the transverse members 28 and 29, and the longitudinal members 30, 30', 31, and 31' form a carriage generally indicated by the letter E which is vertically adjustable by sliding the collars 24, 25, 26 and 27 along the lengths of the posts 20, 21, 22, and 23. A pad 32 is fixedly attached to the upper end of the post 20 and a pad 32' is fixedly attached to the upper end of the post 23.

A windlass 33 is fixedly attached to the upper end of post 21 and a windlass 33' is fixedly attached to the upper end of the post 22. The windlass 33 and the windlass 33' are provided with customary pawl and ratchet arrangements and a chain 35 on a pulley 34 of the windlass 33 is fixedly attached to an eyelet 36 extending from the collar 25. Similarly, a chain 37 on the pulley 38 of the windlass 33' is fixedly attached to an eyelet 39 extending from the collar 26. When the windlass 33 is operated in the customary manner, the collar 25 is raised or lowered along the length of the post 21, and when the windlass 33' is operated in the customary manner, the collar 26 is raised or lowered along the length of the post 22.

A pulley 40 is fixedly mounted on the collar 25, a pulley 41 is fixedly mounted on the collar 24, a pulley 42 is fixedly mounted on the collar 26, and a pulley 45 is fixedly mounted on the collar 27. A first leveling chain 44 extends from an eyelet 46 fixedly positioned at the lower end of the post 21 and over the pulley 40, thence substantially parallel to the first transverse member 28 and under the pulley 41, and thence to a hook 46 extending below the pad 32. Similarly, a second leveling chain 47 extends from the eyelet 48 fixedly positioned at the lower end of the post 22 and over the pulley 42, thence substantially parallel to the second transverse member 29 and under the pulley 45, and thence to a hook 49 extending below the pad 32'.

The first leveling chain 44 results in the collar 24 being raised and lowered along the length of the post 20 when the collar 25 is raised and lowered along the length of the post 21 by the action of the windlass 33. Similarly, the second leveling chain 47 results in the collar 27 being raised and lowered along the length of the post 23 when the collar 26 is raised and lowered along the length of the post 22 by the action of the windlass 33'. Thus, when the windlass 33 is operated, that end of the carriage D supported by the posts 20 and 21 is raised and lowered and when the windlass 33' is operated, that end of the carriage supported by the posts 22 and 23 is raised or lowered. This carriage motion resulting from the operation of the windlass 33 and the windlass 33' is used to adjust the vertical position of the picking frames A and B and the intermediate frame C supported by the main frame D.

The right picking frame A and the left picking frame B are supported parallel to each other between the first transverse member 28 and the second transverse member 29 by extending the first longitudinal member 30 through a block 61 and a block 62 fixedly attached to one side of the picking frame A, by extending the second longitudinal member 31 through a block 63 and a block 64 fixedly attached to the second side of the right picking frame A, by extending the third longitudinal member 30' through a block 61' and a block 62' fixedly attached to one side of the left picking frame B, and by extending the fourth longitudinal member 31' through a block 63' and a block 64' fixedly attached to the second side of the left picking frame B. The blocks 50, 50', 51 and 51' are slidably movable along the length of the first transverse member 28 and the blocks 52, 52', 53 and 53' are slidably movable along the length of the second transverse member 29. Similarly, the blocks 61 and 62 are slidably movable along the first longitudinal member 30, the blocks 63 and 64 are slidably movable along the second longitudinal member 31, the blocks 61' and 62' are slidably movable along the third longitudinal member 30', and the blocks 63' and 64' are slidably movable along the length of the fourth longitudinal member 31'.

Thus, the picking frames A and B are laterally movable with respect to each other along the transverse members 28 and 29 and longitudinally movable with respect to each other along the longitudinal members 30, 30', 31, and 31'. The lateral motion of the picking frames A and B is provided by a lateral positioning mechanism comprising a tab 54 extending from the block 51, a tab 54' extending from the block 50', a tab 55 extending from the block 53, and a tab 55' extending from the block 52'; a two-segment screw 56 extending parallel to the first transverse member 28 through tabs 54 and 54'; and a two-segment screw 56' extending parallel to the second transverse member 29 through the tabs 55 and 55'.

The screw 56 has a scored portion 57 between its two segments and this scored portion 57 of the screw 56 extends through a bracket 58 fixedly attached to the midlength of the first transverse member 28 so as to prevent lateral motion of the screw 56. Similarly, the screw 56' has a scored portion 57' between its two segments and this scored portion 57' of the screw 56' extends through a bracket 58' attached to the midlength of a second transverse member 29 so as to prevent lateral motion of the screw 56'.

The screw 56 is of known type such that rotation of its first segment causes the tab 54, the block 51, and the right picking frame A to move toward or away from the left picking frame B and simultaneous rotation of its second segment causes an equal and opposite motion of the tab 54', the block 50', and the left picking frame B. Similarly, the screw 56' is of known type such that rotation of its first segment causes the tab 55, the block 53 and the right picking frame A to move laterally with respect to the left picking frame B and simultaneous rotation of its second segment causes the tab 55', the block 52' and the left picking frame B to move laterally in an equal and opposite direction.

One end of the screw 56 extends through a bracket 59 mounted on the first transverse member 28 adjacent to the collar 24 and the screw 56 is rotated by rotating a handle 60 attached to this end of the screw 56. Similarly, one end of the screw 56' extends through a bracket 59' mounted on the second transverse member 29 adjacent to the collar 27 and the screw 56' is rotated by rotating a handle 60' attached to this end of the screw 56'. Longitudinal motion of the picking frames A and B with respect to each other is provided by a longitudinal positioning mechanism comprising a tab 66 extending from the block 63, a tab 67 extending from the block 64, a tab 66' extending from the block 61', and a tab 67' extending from the block 62'; a two-segment screw 68 extending generally parallel to the second longitudinal member 31 through the tabs 66 and 67; and two-segment screw 68' extending parallel to the third longitudinal member 30' through the tabs 66' and 67'. The screw 68 has a scored portion 69 between its two segments and this scored portion 69 extends through a bracket 70 fixedly attached to the midlength of the second longitudinal member 31 so as to prevent longitudinal motion of the screw 68 relative to the second longitudinal member 31. Similarly, the screw 68' has a scored portion 69' and this scored portion 69' of the screw 68' extends through a bracket 70' attached to the midlength of the third longitudinal member 30' so as to prevent longitudinal motion of the screw 68' relative to the third longitudinal member 30'.

The screw 68 is of known type such that rotation of its first segment causes the tab 66 and the block 63 to move toward and away from the first transverse member 28 and simultaneous rotation of its second segment causes identical motion of the tab 67 and the block 64. Thus, rotation of the screw 68 will cause the right picking frame A to move toward or away from the first transverse member 28. Similarly, the screw 68' is of conventional known type such that rotation of its first segment causes the tab 66' and the block 61' to move toward or away from the first transverse member 28 and simultaneous rotation of its second segment causes identical motion of the tab 67' and the block 62' with respect to the first transverse member 28. Thus, rotation of the screw 68' causes the left picking frame B to move toward or away from the first transverse member 28.

One end of the screw 68 is extended through a bracket 71 mounted on the second longitudinal member 31 adjacent to the block 51 and the screw 68 is rotated by rotating a handle 72 attached to this end of the screw 68. Similarly, one end of the screw 68' is extended through a bracket 71' mounted on the third longitudinal member 30' adjacent to the block 50' and the screw 68' is rotated by rotating a handle 72' attached to this end of the screw 68'. Thus, the positions of the picking frames A and B are vertically adjustable by changing the position of the carriage E with the windlass 33 and the windlass 33', laterally adjustable by rotating the handle 60 and the handle 60', and longitudinally adjustable by rotating the handle 72 and the handle 72'.

The right picking frame A and the left picking frame B are substantially mirror images of each other and the detailed description to follow will be restricted to the right picking frame A. However, the part of the left picking frame B corresponding to each part of the right picking frame A described is indicated in the drawings by the prime of the reference number used for the right picking frame A and the construction of the left picking frame B will be readily understood from the description of the right picking frame A. The right picking frame A has a lower frame member 73 at one side and a lower frame member 74 at its other side. A lateral member 75 extends between one end of the lower frame member 73 and corresponding end of the lower frame member 74 and a lateral member 76 extends between the other end of the lower frame member 73 and the corresponding end of the lower frame member 74. It is to the lower frame member 74 that the blocks 61' and 62' are fixedly attached and it is to the lower frame member 73 that the blocks 63' and 64' are fixedly attached. Thus, the lower frame members 73 and 74 and the lateral members 75 and 76 form a rectangular frame which is vertically movable with the transverse members 28 and 29, laterally movable with the transverse members 28 and 29, and horizontally movable along the longitudinal members 30 and 31.

Extending vertically from the intersection of the lateral member 75 and the lower frame member 73 is a vertical member 77 and extending vertically from the other end of the lateral member 75 is a vertical member 78. An upper member 81 extends between the extending end of the vertical member 77 and the extending end of the vertical member 78 parallel to the lateral member 75. This upper member 81, the lateral member 75, the vertical member 77, and the vertical member 78 form a rectangular frame generally perpendicular to the rectangular frame formed by the lower frame member 73, the lower frame member 74, the lateral member 75, and the lateral member 76.

Extending vertically from the intersection of the lower frame 73 and the lateral member 76 is a vertical member 79 and extending vertically from the other end of the lateral member 76 is a vertical member 80. An upper member 82 extends between the extending end of the vertical member 79 and the extending end of the vertical member 80 parallel to the lateral member 76. This upper member 82, the lateral member 76, the vertical member 79, and the vertical member 80 form a rectangular frame generally perpendicular to the rectangular frame formed by the lower frame member 73, the lower frame member 74, the lateral member 75 and the lateral member 76.

Extending parallel to the lower frame member 73 between the vertical members 77 and 79 is a first support member 83 and extending parallel to the lower frame member 74 between the vertical member 78 and the vertical member 80 is a second support member 84. The support members 83 and 84 are parallel to each other and lie in a plane of reference parallel to a plane of reference containing the lower plane members 73 and 74 and the lateral members 75 and 76. Thus, vertical, lateral, and longitudinal adjustment of the position of the right picking frame A results in vertical, lateral, and longitudinal adjustment of the position of a reference plane containing the support members 83 and 84.

Positioned above and along the length of the support member 83 are six axle support brackets 85a, 85b, 85c, 85d, 85e and 85f and positioned above and along the length of the support member 84 are six axle support brackets 86a, 86b, 86c, 86d, 86e and 86f. Rotatably inserted through the axle support bracket 85a and the axle support bracket 86a is a first upper axle 87a, rotatably inserted through the axle support bracket 85b and the axle support bracket 86b is a second upper axle 87b, rotatably inserted through the axle support bracket 85c and the axle support bracket 86c is a third upper axle 87c, rotatably inserted through the axle support bracket 85d and the axle support bracket 86d is a fourth upper axle 87d, rotatably inserted through the axle support bracket 85e and the axle support bracket 85e is a fifth upper axle 87e, and rotatably inserted through the axle support bracket 85f and the axle support bracket 86f is a sixth upper axle 87f. The axle support brackets 85 and 86 are positioned so that the upper axles 87 are parallel to each other with their center lines substantially perpendicular to the support members 83 and 84, and more or less equally spaced between the vertical members 77 and 79.

Position below and along the length of the support member 84 are six axle support brackets 89a, 89b, 89c, 89d, 89e and 89f and positioned below and along the length of the support member 83 are six axle support brackets 90a, 90b, 90c, 90d, 90e and 90f. Rotatably inserted through the axle support bracket 89a and the axle support bracket 90a is a first lower axle 91a, rotatably inserted through the axle support bracket 89b and the axle support bracket 90b is a second lower axle 91b, rotatably inserted through the axle support bracket 89c and the axle support bracket 90c is a third lower axle 91c, rotatably inserted through the axle support bracket 89d and the axle support bracket 90d is a fourth lower axle 91d, rotatably inserted through the axle support bracket 89e and the axle support bracket 90e is a fifth lower axle 91e, and rotatably inserted through the axle support bracket 89f and the axle support bracket 90f is a sixth lower axle 91f. The axle support brackets 89 and 90 are positioned so that the lower axles 91 are parallel to each other and to the upper axles 87 and are spaced midway between the upper axles 87 along the lengths of the support members 83 and 84.

A mounting plate 92 extends between the lower frame member 73 and the lower frame member 74 and four motors 93a, 93b, 93c and 93d are fixedly mounted upon and uniformly spaced along the mounting plate 92 beneath the upper axles 87 and the lower axles 91. Each of the motors 93 is an electrical motor of known type having a gear reduction mechanism 94 integrally associated with it. The drive shaft 95 of the gear reduction mechanism 94 of each of the motors 93 carries a pulley 96 and operation of the motor 93 in known manner causes rotation of the pulley 96.

Each of the upper axles 87 has a pulley 97 fixedly positioned between the support member 83 and the support member 84 and each of the lower axles 91 has a pulley 98 positioned on it between the support member 83 and the support member 84. In addition, each of the upper axles 87a, 87b, 87c, 87d, 87e and 87f has a pulley 99 positioned on it between the support member 83 and each pulley 97.

A first driving belt 100a extends from the pulley 96a to and over the pulley 97a, thence to and over the pulley 97b, and thence back to and under the pulley 96a. A second driving belt 100b extends from the pulley 96b to and over the pulley 98b, thence to and over the pulley 97c, thence to and over the pulley 98c, and thence back to and under the pulley 96b. A third driving belt 100c extends from the pulley 96c to and over the pulley 97d, and thence to and over the pulley 97e, and thence back to and under the pulley 96c. A fourth driving belt 100d extends from the pulley 96d to and over the pulley 98e, thence to and over the pulley 97f, thence to and over the pulley 98f, and thence back to and under the pulley 96d.

A first transfer belt 101 extends from the pulley 98a to and over the pulley 99a, thence to and over the pulley 99b, and thence back to and under the pulley 98a. Similarly, a second transfer belt 101b from the pulley 98d to and over the pulley 99d, thence to and over the pulley 99e, and thence back to and under the pulley 98d. It will be understood that the pulleys 96 are positioned on the drive shafts 95 and that the pulleys 97, 98, and 99 are positioned on the axles 87 and 91 so that the belts 100 and 101 move in substantially vertical planes of reference without interfering with each other. It will also be understood that this arrangement of the pulleys 96, 97, 98, and 99 and of the belts 100 and 101 results in the axles 87 and 91 rotating in the same direction as the drive shafts 95 when all the drive shafts 95 are rotated in the same direction. This is best shown in FIG. 2 where it will be observed that when the drive shafts 95 are all rotated in a clockwise direction, all the axles 87 and 91 will also rotate in a clockwise direction.

The intermediate picking frame C is fixedly positioned on the transverse members 28 and 29 between the right picking frame A and the left picking frame B by fixedly attaching a drum axle mounting 102 on the transverse member 28 above the bracket 58, by fixedly attaching a drum axle mounting 103 to the transverse member 29 above the bracket 58′, and by rotatably extending a drum axle 104 between the drum axle mountings 102 and 103. A drive axle 105 rotatably extends between the transverse member 28 and the transverse member 29 beneath the drum axle 104. Bearing fittings (not shown) of known type are used to support the ends of the drive axle 105 at the transverse members 28 and 29.

The drum axle 104 and the drive axle 105 are positioned so that the axes of rotation of the drum axle 104 and the drive axle 105 are parallel to each other and are in a plane of reference perpendicular to the transverse members 28 and 29 and which is always equidistant from the right picking frame A and the left picking frame B as the picking frames A and B are moved toward and away from each other. It will now be understood that the drum axle 104 is vertically movable with the picking frames A and B and that the picking frames A and B move laterally and longitudinally with respect to the drum axle 104.

Distributed along the length of the drum axle 104 are a plurality of directly driven rotary drum segments 106 and alternately spaced with the directly driven rotary drum segments 106 along the length of the drum axle 104 are a plurality of remotely driven rotary drum segments 107. Each of the plurality of directly driven rotary drum segments 106 is concentric with the axis of rotation of the drum axle 104 and each of the directly driven rotary drum segments 106 is locked to the drum axle 104 in known manner using a key 108 so that each of the plurality of directly driven rotary drum segments 106 rotates with the drum axle 104.

Each of the plurality of remotely driven rotary drum segments 107 is also concentric with the axis of rotation of the drum axle 105. However, each of the plurality of remotely driven rotary drum segments 107 is freely rotatable about the drum axle 104 on a sleeve bearing 109. Each of the remotely driven rotary drum segments 107 has a drum pulley 110 integral with it, and a plurality of drive pulleys 111 are distributed along the length of the drive axle 105.

Each of the plurality of drum pulleys 110 is joined by one of a plurality of drive belts 112 to one of the plurality of drive pulleys 111. The drive pulleys 111 are fixedly mounted on the drive axle 105 and rotation of the drive axle 105 causes rotation of the drive pulleys 111 and of the plurality of remotely driven rotary drum segments 107. The drum pulleys 110 and the drive pulleys 111 are positioned so that the drive belts 112 are in substantially vertical planes.

A drive axle motor 113 is mounted on and beneath the transverse member 28. The drive axle motor 113 is of known conventional type having a pulley 114 fixedly mounted at one end of its drive shaft 115. The pulley 114 is connected by a belt 116 to a drive axle pulley 117 fixedly mounted at that end of the drive axle 105 adjacent to the transverse member 28. Operation of the drive axle motor 113 in known manner causes rotation of the drive axle 105 and of the plurality of remotely driven rotary drum segments 107. Fixedly mounted on and beneath the transverse member 29 is a drum axle motor 118. The drum axle motor 118 is of known type having a pulley 119 fixedly mounted at one end of its drive shaft 120. The pulley 119 is connected by a belt 121 to a drum axle pulley 122 mounted at that end of the drum axle 104 adjacent to the transverse member 29. Operation of the drum axle motor 118 in known manner causes rotation of the drum axle pulley 122 and of the plurality of directly driven rotary drum segments 106. It will now be understood that by operation of the drive axle motor 113 and of the drum axle motor 118 in known manner, the directly driven rotary drum segments 106 and the remotely driven rotary drum segments 107 may be rotated in opposite rotational directions.

The ends of the upper axles 87 and of the lower axles 91 extending beyond the support member 84 each carry a rotating member 123 and in that embodiment of the invention disclosed herein, each rotating member 123 has a face 124 from which a plurality of flexible rubber picking fingers 125 extend. The flexible rubber picking fingers 125 are of known type and are inserted into the faces 124 of the rotating members 123 in the same manner as they are customarily inserted into the surfaces of the rotary drums used in previous chicken picking machines. When the rotating members 123 are not rotating, the picking fingers 125 extend toward a plane of reference perpendicular to the transverse members 28 and 29 and between the picking frames A and B as shown in FIG. 1.

The number of picking fingers 125 extending from each of the faces 124 of the rotating members 123 may vary. However, in the specific embodiment of the invention described herein, there are twelve picking fingers 125 extending from each of the faces 124 of the rotating members 123 and on each face 124 the picking fingers 125 are arranged in two circles. Eight of the picking fingers 125 are on each face 124 equidistantly spaced along an outer circle concentric with the axis of rotation of the rotating member 123 and the remaining four picking fingers on each face 124 are uniformly spaced along an inner circle concentric with the axis of rotation of the rotating member 123. On each face 124, the eight picking fingers in the outer circle are angularly displaced with respect to the four picking fingers 125 in the inner circle so that radii extending from the axis of rotation of the rotating member 123 to the twelve picking fingers 125 are all separated by an equal number of degrees. The twelve picking fingers 125 extending from each face 124 are constructed in known manner to be flexible only in a single plane and the picking fingers 125 are positioned in the faces 124 so as to be flexible toward and away from the axis of rotation of the rotating member 123.

The drum segments 106 and 107 are substantially identical and have one side open to facilitate the insertion of flexible rubber picking fingers 127. The flexible rubber picking fingers 127 are identical to the picking fingers 125 and extend from the peripheral surface 128 of both the plurality of directly driven rotary drum segments 106 and the plurality of remotely driven rotary drum segments 107 in a radial manner. In the specific embodiment of the invention described herein, each of the drum segments 106 and 107 carries twelve picking fingers 127. The twelve picking fingers 127 are distributed about the peripheral surface 128 of each of the plurality of rotary drum segments 106 and 107 by equally distributing six picking fingers 127 along each of two laterally displaced circumferential paths on each peripheral surface 128. The six picking fingers 127 distributed along one circumferential path are angularly displaced from the six picking fingers 127 distributed along the second circumferential path by an amount sufficient to make the angular distance between each of the twelve picking fingers 127 equal.

*Operation*

Although the motors 93, 93', 113, and 118 are of known type and will rotate their respective drive shafts 95, 95', 115, and 120 in either of two rotational directions, it has been found that effective picking of substantially all feathers from a chicken or other fowl is obtained when the drive shafts 95 of the motors 93 are rotated in a clockwise direction as viewed in FIG. 2, when the drive shafts 95' of the motors 93' are rotated in a counterclockwise direction as viewed in FIG. 3, when the drive shaft 115 is rotated in a clockwise direction as viewed in FIG. 1, and when the drive shaft 120 is rotated in a counterclockwise direction as viewed in FIG. 1. This rotation of the drive shafts 95, 95', 115, and 120 results in the flexible rubber picking fingers 125 carried by the right picking frame A rotating in a clockwise direction as viewed in FIG. 2, the flexible rubber picking fingers 125' carried by the left picking frame B rotating in a counterclockwise direction about the axes of rotation of the axles 87' and 91' as viewed in FIG. 3, and in the flexible rubber picking fingers 127 of the intermediate picking frame B carried by the directly driven rotary drum segments 106 rotating in the opposite rotational direction from the flexible rubber picking fingers 127 carried by the remotely driven rotary drum segments 107.

From the foregoing, it will be seen that the picking machine disclosed herein provides a three sided channel H having one side formed by the picking fingers 125 extending from the right picking frame A, a second side formed by the picking fingers 125' extending from the left picking frame B, and a bottom formed by the picking fingers 127 extending from the intermediate picking frame C. It is through this channel that a chicken N from which feathers are to be removed is passed and it will also be understood from the operation of the motors 93, 93', 113 and 118 described above, that as the picking fingers 125 and 125' are rotated, the picking fingers 125 are moving in a direction opposite to the direction of the picking fingers 125' relative to the chicken N. Similarly, it will be understood that the picking fingers 127 extending from the directly driven rotary drum segments 106 are moving in a direction transverse to the direction of motion of the chicken N through the channel H in a direction which is opposite to the direction in which the picking fingers 127 extending from the remotely driven drum segments 107 are moving.

The result of this arrangement is that as a chicken N suspended head lowermost from a shackle 200 carried by a conveyor belt 201 of known type passes through the channel H, the lowermost portion of its body is alternately engaged by the picking fingers 127 rotating first in one direction transverse to its direction of motion through the picking machine and then in the opposite direction transverse to its direction of motion through the picking machine. The lowermost portion of the body of the chicken N is also engaged on one side by the picking fingers 125 moving in the same direction as the direction of motion 300 of the chicken N through the picking machine and on the opposite side by the picking fingers 125' moving in a direction opposite to the direction of motion 300 of the chicken N through the picking machine. Similarly, the uppermost portion of the chicken's body is engaged by the picking fingers 125 moving in a direction opposite to the direction of motion 300 of the chicken N through the picking machine and by the fingers 125' moving in the same direction as the direction of motion 300 of the chicken N through the picking machine. However, one side of that portion of the chicken N between its lowermost portion and its uppermost portion is alternately engaged by the picking fingers 125 moving in the same direction as the direction of motion 300 of the chicken N through the picking machine and in the opposite direction to the direction of motion 300 of the chicken N through the picking machine.

This can be most easily seen from FIG. 2 in which it will be seen that clockwise rotation of both the upper axles 87 and the lower axles 91 and the vertical overlap between those rotating members 123 rotated by the upper axles 87 and those rotating members 123 rotated by the lower axles 91 result in picking fingers 125 along the channel H alternately rotating in opposite directions in this area of vertical overlap. It will be understood that there is a similar area of vertical overlap with respect to the rotating members 123' rotated by the upper axles 87' and the rotating members 123' rotated by the lower axles 91' and that the other side of the chicken N is also being engaged by picking fingers 125' moving alternately in the same direction and in the opposite direction to the direction of motion 300 of the chicken N through the picking machine.

This motion of the picking fingers 125 and 127 causes a chicken N passing through the channel H to be alternately urged toward the right picking frame A and the left picking frame B and results in substantially all portions of the chicken's body being engaged by picking fingers 125 moving both in the same direction as the direction of motion 300 of the chicken N through the picking machine and in a direction opposite to the direction of motion of the chicken N through the picking machine. In addition, since the picking fingers 125 and 125' are rotating about axes of rotation extending toward the path of the chicken N through the picking machine, the chicken N is also engaged by picking fingers 125 and 125' which are alternately moving upwardly and downwardly.

Moreover, as the picking fingers 125 and 125' rotate about their axes of rotation, the picking fingers 125 and 125' tend to bend outwardly as the result of centrifugal force as is shown in FIG. 6. As a result, the picking fingers 125 and 125' extending from each face 124 or 124' engage the chicken N with a wiping action along a substantial portion of the length of each picking finger 125 and 125'. This combined with the variety of directions of motion of the picking fingers 125 and 127 results in substantially all feathers being removed from the chicken N as it passes through the channel H.

It will be obvious to those skilled in the art that many variations may be made in the embodiments chosen for the purpose of illustrating the present invention without departing from the scope thereof as defined by the appended claims.

What is claimed as invention is:

1. In a poultry picking machine through which a fowl travels along a path, a plurality of rotating members disposed on opposite sides of said path on axes that extend toward said path with the rotating members on one side of said path rotating in the opposite direction from those on the other side of said path relative to lines of reference extending across said path, a first plurality of picking fingers extending toward said path from said rotating members, a plurality of drum segments rotating about an axis below and substantially parallel to said path with adjacent drum segments rotating in opposite directions, and a second plurality of picking fingers radially extending from said drum segments.

2. In a poultry picking machine, a pair of picking frames having a channel therebetween; a plurality of rotating members disposed in said channel, said plurality of rotating members including a first series of rotating members rotatably carried by one of said picking frames and a second series of rotating members rotatably carried by the other of said picking frames; resilient picking fingers on each of said plurality of rotating members, said fingers extending toward the opposite picking frame; means on one of said picking frames for rotating the said first series of rotating members; means on the other of said picking frames for rotating the second series of rotating members; a plurality of drum segments coaxially aligned within said channel and below said plurality of rotating members, said plurality of drum segments including a first series of drum segments and a second series of drum segments alternately disposed with the first series of drum segments; a plurality of resilient picking fingers extending radially from each of said plurality of drum segments; a first drive means for rotating said first series of drum segments in a first direction; and a second drive means for rotating said second series of drum segments in a direction opposite to said first direction.

3. In a poultry picking machine, a left picking frame, a right picking frame and an intermediate picking frame, said picking frames being substantially parallel, coextensive and spaced apart to form a channel; a first plurality of rotating members rotatably carried by said left picking frame, said first plurality of rotating members being aligned along and disposed within said channel; left drive means for rotating said first plurality of rotating members, said left drive means being carried by said left picking frame; a plurality of resilient picking fingers extending from each of said first plurality of rotating members toward said right picking frame; a second plurality of rotating members rotatably carried by said right picking frame, said second plurality of rotating members being aligned along and disposed within said channel; right drive means for rotating said second plurality of rotating members, said right drive means being carried by said right picking frame; a plurality of resilient picking fingers extending from each of said second plurality of rotating members toward said left picking frame; a plurality of coaxially aligned drums rotatably carried by said intermediate picking frame below said rotating members, said drums including a first series of drums and a second series of drums; a first drive means for rotating said first series of drums in a first direction; a second drive means for rotating said second series of drums in a direction opposite to said first direction; and resilient picking fingers extending substantially radially from each of said plurality of drums.

4. In a poultry picking machine, a left picking frame and a right picking frame, said picking frames being spaced apart to form a channel therebetween; a first plurality of rotating members rotatably carried by said left picking frame, said first plurality of rotating members being disposed within said channel; left drive means for rotating said first plurality of rotating members; a first plurality of resilient picking fingers extending from each of said first plurality of rotating members toward said right picking frame; a second plurality of rotating members rotatably carried by said right picking frame, said second plurality of rotating members being disposed within said channel; right drive means for rotating said second plurality of rotating members; a second plurality of resilient picking fingers extending from each of said second plurality of rotating members toward said left picking frame; a plurality of coaxially aligned drum segments rotatably mounted within said channel below said rotating members, said drum segments including a first series of drum segments and a second series of drum segments; a first drive means for rotating said first series of drum segments in a first direction; a second drive means for rotating said second series of drum segments in a direction opposite to said first direction; and resilient picking fingers extending substantially radially from each of said plurality of drum segments.

5. In a poultry picking machine through which a fowl travels along a path, a first plurality of rotating members disposed along the length of said path, a second plurality of rotating members disposed along the length of said path alternately with and below the said first plurality of rotating members, a third plurality of rotating members disposed along the length of said path substantially opposite said first plurality of rotating members, a fourth plurality of rotating members disposed along the length of said path substantially opposite said second plurality of rotating members, a first plurality of picking fingers extending from the rotating members toward the said path, means for rotating the first plurality and the second plurality of rotating members in a first rotational direction about axes extending toward said path, means for rotating the third plurality and the fourth plurality of rotating members in a second rotational direction about axes extending toward said path, and a second plurality of picking fingers extending upwardly toward said path.

6. In a poultry picking machine having a main frame; transverse members vertically adjustable on said main frame; longitudinal members slidably carried at each end by said transverse members for lateral adjustment of the distance between said longitudinal members; a pair of picking frames slidably mounted on said longitudinal members for adjustment of the longitudinal positions of said picking frames with respect to each other, said pair of picking frames including a left picking frame and a right picking frame and being substantially parallel, coextensive, and spaced apart to form a channel therebetween; a first plurality of rotating members rotatably carried by said left picking frame, said first plurality of rotating members being aligned along and disposed within said channel; left drive means for rotating said first plurality of rotating members; a first plurality of resilient picking fingers extending from each of said first plurality of rotating members toward said right picking frame; a second plurality of rotating members rotatably carried by said right picking frame, said second plurality of rotating members being aligned along and disposed within said channel; right drive means for driving said second plurality of rotating members, said right drive means being carried by said right picking frame; a second plurality of resilient picking fingers extending from each of said second plurality of rotating members toward said left picking frame; a plurality of coaxially aligned drums rotatably mounted within said channel below said rotating members, said drums including a first series of drums and a second series of drums; a first drive means for rotating said first series of drums in a first direction; a second drive means for rotating said second series of drums in a direction opposite to said first direction; and resilient picking fingers extending substantially radially from each of said plurality of drums.

7. A poultry picking machine including a pair of opposed, transversely spaced picking members rotatably mounted on horizontal axes, each having a plurality of flexible, outwardly extending fingers mounted thereon and defining therebetween a path of travel for poultry through said machine, and a picking member rotatably mounted on a horizontal axis that is substantially parallel to and below said path of travel and having a plurality of flexible, outwardly extending fingers mounted thereon for defeathering those parts of said poultry that are in the lower portion of said path of travel.

8. A poultry picking machine including a plurality of pairs of transversely spaced picking members rotatable on horizontal transverse axes and defining a path of travel for poultry through said machine, and a rotatable picking member rotatable on a horizontal axis below said first mentioned picking members in the vertical plane of the path defined by said first mentioned picking members.

9. A poultry picking machine including a plurality of pairs of transversely spaced picking members rotatable on horizontal transverse axes and defining a path of travel for poultry through said machine, and a single elongated rotatable picking member below said first mentioned picking members and rotatable upon a horizontal axis parallel to said path and in the vertical plane of said path.

10. A poultry picking machine including a plurality of pairs of transversely spaced support members mounted on transverse horizontal axes and defining a path of travel for poultry through said machine, a plurality of flexible picking fingers mounted on each support member and moving with said support member in concentric circles adjacent to said path, and an elongated rotatable picking member rotatable on a horizontal longitudinal axis below said first mentioned picking members in a plane of the path defined by said first mentioned picking members, and a plurality of flexible picking fingers mounted on said elongated rotatable member moving with said elongated rotatable picking members in concentric circles in planes normal to said path of travel.

References Cited by the Examiner
UNITED STATES PATENTS

| 2,012,655 | 8/1935 | Bowman. | |
| 2,389,404 | 11/1945 | Barker | 17—11.1 |
| 2,571,034 | 10/1951 | Harvey | 17—11.1 |
| 3,044,108 | 7/1962 | De Long | 17—11.1 |

SAMUEL KOREN, *Primary Examiner.*

LUCIE H. LAUDENSLAGER, ALDRICH F. MEDBERY, *Examiners.*